W. S. REED.
STUFFING BOX FOR REAR AXLE HOUSING.
APPLICATION FILED NOV. 15, 1915.

1,201,870.

Patented Oct. 17, 1916.

WITNESSES.
William N. Scott
Chas. H. Young.

INVENTOR
William S. Reed

UNITED STATES PATENT OFFICE.

WILLIAM S. REED, OF STOCKTON, CALIFORNIA.

STUFFING-BOX FOR REAR-AXLE HOUSING.

1,201,870.    Specification of Letters Patent.    Patented Oct. 17, 1916.

Application filed November 15, 1915.  Serial No. 61,514.

*To all whom it may concern:*

Be it known that I, WILLIAM S. REED, a citizen of the United States, residing at Stockton, in the county of San Joaquin and State of California, have invented certain new and useful Improvements in Stuffing-Boxes for Rear-Axle Housing, of which the following is a specification.

This invention relates to a stuffing box for the rear axle housing for motor vehicles and has for its object the retaining of lubricating oils and grease within the rear axle housing of motor vehicles. The stuffing box as seen in the sectional assembly drawing fits over the rear axle shaft, and is held in lateral position by the roller bearing sleeve and roller bearing case abutting against it. Grease and lubricating oils are retained by the annular felt packing rings which are shown on the inside diameter as well as the outside diameter of the body of the stuffing box.

This invention keeps all oils and grease from working out as they now do through the bearings, and allows a light grade of oil to be used for the lubrication of all the component parts of mechanism inclosed within the rear axle housing. Spalls or small particles of material which occur due to wearing of the parts, will where a light grade of lubricating oil is used be washed off the moving parts and will be deposited in the bottom of the case but where a heavy grease is used, the spalls and minute cuttings due to wear are held in suspension and carried by the grease, thereby causing abnormal wear on the mechanism as well as the stripping of gear teeth in some cases.

The roller bearings in most cases due to their construction have the action of a pump thereby greatly stimulating the flow of the oil through the outer bearings out of the housing and on the wheels when the car is in motion and the centrifugal force set up by the revolving wheels throws the oil over the body of the vehicle. These difficulties are what this invention is designed to eliminate.

With these and other objects in view the invention consists of certain novel features of construction, as will be more fully described and particularly pointed out in the appended claims.

Figure 1:
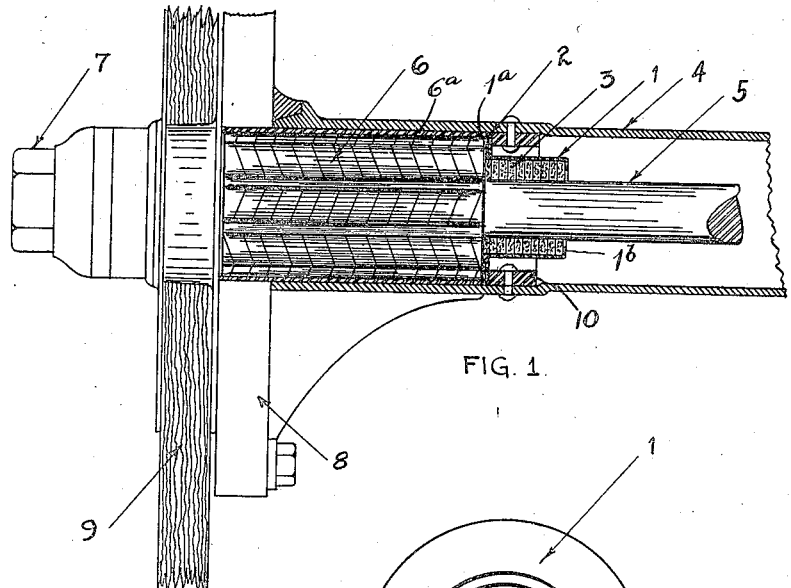
Figure 2:
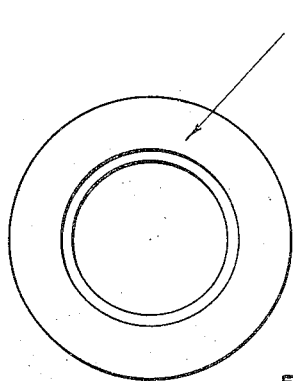
Figure 3:
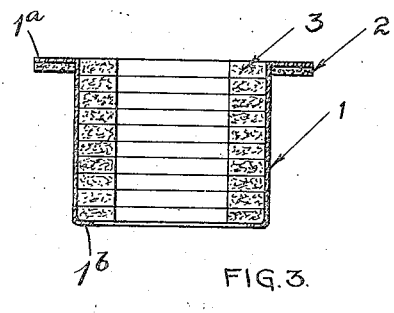

In the drawings Figure 1 shows an assembled sectional view taken on the center line of a stock roller bearing showing the stuffing box 1 in position, Fig. 2 is a plan view of the stuffing box looking down on the extended annular flange, Fig. 3 is a sectional view of the stuffing box which shows clearly the extended annular flange and internal annular flange and the packing shown in place, any number of rings of packing may be used as I do not confine myself to any particular number or material.

In the drawing the same numerals apply to the different views, 1 shows the stuffing box which may be made of any suitable material having an external annular flange $1^a$ at one end and at the opposite end an internal annular flange $1^b$. The packing in the stuffing box is shown at 3, the same being rings of felt or other suitable material.

2 is an outer annular ring packing which may be felt or any other suitable material.

4 is the rear axle housing which in the various vehicles on the market have their particular design.

5 is the rear axle shaft, 6 the usual type of roller bearings, 7 the hub cap, 8 the rear axle brake drum, and 9 the spokes of a wheel.

It is found in practice that my invention does all that I claim it will do, and the construction is extremely simple, inexpensive, and practical, it also has the features of being very easily installed in any motor vehicle without in any way interfering with the proper working of any of the mechanism in the vehicle as constructed by the manufacturers.

The stuffing box 1 is so positioned in the axle housing 4 that its external flange $1^a$ abuts against the end of the roller bearing sleeve $6^a$ and it is held against longitudinal movement by a ring 10 riveted or otherwise fixed in the axle housing behind the flange $1^a$, the latter being located between the sleeve $6^a$ and the ring 10, with the packing 2 interposed therebetween. The sleeve $6^a$ thus forms an abutment against which the flange $1^a$ is held by the ring 10. The packing 3 is held in the stuffing box between the roller bearing 6 and the inturned annular flange $1^b$ at the farther end of the stuffing box.

Having thus described my invention what I claim as new and useful and desire to secure by Letters Patent is:

1. In a motor vehicle axle shaft having an inclosing housing, a stuffing box mounted in the housing around the axle shaft, a packing in the stuffing box, retaining means for the packing, one end of the stuffing box having an outstanding flange and the axle housing having an abutment against which one side of the flange seats, and a retaining ring secured in the axle housing on the other side of the flange.

2. In a motor vehicle axle shaft having an inclosing housing, a stuffing box mounted in the housing around the axle shaft, a packing in the stuffing box, retaining means for the packing, one end of the stuffing box having an outstanding flange and the axle housing having an abutment against which one side of the flange seats, a retaining ring secured in the axle housing on the other side of the flange, and a packing washer between the flange and the ring.

In testimony whereof I affix my signature in presence of two witnesses.

WILLIAM S. REED.

Witnesses:
WILLIAM N. SCOTT,
CHAS. H. YOUNG.